United States Patent [19]

Waki

[11] Patent Number: 4,477,624

[45] Date of Patent: Oct. 16, 1984

[54] HEAT-RESISTANT SYNTHETIC RESIN COMPOSITION

[75] Inventor: Misao Waki, Touin, Japan

[73] Assignee: Showa Electric Wire & Cable Co., Ltd., Kanagawa, Japan

[21] Appl. No.: 426,833

[22] Filed: Sep. 29, 1982

[30] Foreign Application Priority Data

Nov. 9, 1981 [JP] Japan .................................. 56-178289
Dec. 3, 1981 [JP] Japan .................................. 56-194733

[51] Int. Cl.$^3$ ...................... C08G 18/34; C08G 18/80; C08K 5/13; C08L 79/08
[52] U.S. Cl. .................................... 524/736; 524/323; 524/526; 524/539; 524/590; 524/871; 528/45; 528/73; 528/84
[58] Field of Search ............... 524/736, 871, 538, 352, 524/323, 539, 590; 528/45, 73, 84, 353

[56] References Cited

U.S. PATENT DOCUMENTS

| | | | |
|---|---|---|---|
| 4,081,427 | 3/1978 | Lang | 528/84 |
| 4,156,065 | 5/1979 | Onder | 528/73 |
| 4,269,750 | 5/1981 | Lewalter et al. | 528/84 |
| 4,271,288 | 6/1981 | Woo | 528/353 |
| 4,281,095 | 7/1981 | Dünwald et al. | 528/80 |
| 4,354,965 | 10/1982 | Yue-Guey | 528/73 |

OTHER PUBLICATIONS

*Dictionary of Organic Compounds,* vol. 2, p. 715, 4th ed., Oxford University Press, N.Y. 1965.

*Primary Examiner*—C. Warren Ivy
*Attorney, Agent, or Firm*—Finnegan, Henderson, Farabow, Garrett & Dunner

[57] ABSTRACT

A heat-resistant synthetic resin composition, which comprises (A) 15 to 60% by weight of a film-forming synthetic resin soluble in a phenolic solvent and (B) 85 to 40% by weight of a phenolic solvent, said film-forming synthetic resin containing at least 30% by weight of a polyamide imide type resin obtained by causing (a) a tricarboxylic acid and/or an anhydride thereof containing citric acid and (b) a diisocyanate and/or a derivative obtained by masking diisocyanate with a phenolic compound in amounts of substantially equal moles to react in the phenolic solvent.

6 Claims, 3 Drawing Figures

HEAT-RESISTANT SYNTHETIC RESIN COMPOSITION

BACKGROUND OF THE INVENTION

This invention relates to a novel heat-resistant synthetic resin composition and to a method for the manufacture thereof.

For insulated wires, varnishes, films, laminated sheets, impregnating resins, adhesive agents, etc. which are used in electric appliances, generally phenolic resin, polyvinyl formal resin, polyester resin, alkyd resin, epoxy resin, polyester imide resin, polyamide imide resin, and polyimide resin are adopted.

In recent years, the increasing trend of electric appliances toward enhanced performance and decreased size has encouraged the appreciation of the importance of organic materials such as polyamide imide resin and polyimide resin which enjoy excellent heat resistance.

In the field of insulating varnishes, polyester resin varnishes which have heretofore found rather, widespread at acceptance on account of well-balanced combinations of heat resistance, mechanical properties, electric properties, and economics have come to be replaced in the recent years by varnishes of imide group-containing resins such as polyester imide, polyamide imide, and polyimide resins which offer higher heat resistance.

It is known that among imide group-containing resins, the polyamide imide resin enjoys the best balance of heat resistance, mechanical properties, electric properties, and chemical properties.

The conventional aromatic polyamide imide resin, however, has a disadvantage that the varnish of this resin becomes expensive because this resin is barely soluble in very costly organic polar solvents such as N-methyl-2-pyrrolidone and dimethylacetamide.

Further any varnish which uses an organic polar solvent has a disadvantage that the storage of the varnish itself and the handling of the varnish during its actual use are both very difficult because the organic polar solvent has strong hygroscopicity.

To avoid the trouble, there has been developed a polyamide imide resin having improved solubility in organic solvents by using a specific diamine or diisocyanate as part of the raw materials (U.S. Pat. No. 3,696,077).

Since this polyamide imide resin necessitates use of a specific aromatic diamine or diisocyanate, it has a disadvantage that the properties cannot be balanced easily and the cost of raw materials is high.

SUMMARY OF THE INVENTION

It is, therefore, an object of this invention to provide a heat-resistant synthetic resin composition containing a polyamide imide resin which is soluble in a phenolic solvent and permits quite free combination of starting materials.

The object described above is accomplish by a heat-resistant synthetic resin composition, which comprises (A) 15 to 60% by weight of a film-forming synthetic resin soluble in a phenolic solvent and (B) 85 to 40% by weight of a phenolic solvent, said film-forming synthetic resin containing at least 30% by weight of a polyamide imide resin derived from substantially equal molar amounts of (a) a tricarboxylic acid and/or an anhydride thereof containing at least 5 mol % of citric acid and (b), a diisocyanate and/or a derivative obtained by masking diisocyanate with phenolic compounds.

DETAILED DESCRIPTION OF THE INVENTION

To be used for this invention, the citric acid may be of a type containing water of crystallization or of a type not containing water of crystallization. Since the reaction of a tricarboxylic acid and/or an anhydride of the tricarboxylic acid with diisocyanate and/or derivative of the diisocyanate proceeds with removal of water, however, it is desirable to use anhydrous citric acid containing no water of crystallization from the viewpoint of efficiency of reaction.

As the tricarboxylic acid and/or an anhydride thereof excluding citric acid, one aromatic tricarboxylic acid or anhydride or a mixture of two or more aromatic tricarboxylic acids or anhydrides selected from the aromatic tricarboxylic acids and anhydrides represented by the following formulas (I) and (II), for example, may be used.

(I)  (II)

{wherein, $R_1$ denotes a hydrogen atom, an alkyl group, or a phenyl group and $R_2$ denotes (where, X denotes —$CH_2$—, —CO—, —$SO_2$—, —$C(CH_3)_2$—, or —O—)}.

Generally in view of heat resistance, reactivity, economics, etc., trimellitic anhydride proves to be particularly suitable.

For the purpose of increasing the imide bond ratio and enhancing the heat resistance, a small portion of the tricarboxylic acid may be substituted by a tetracarboxylic acid or derivative thereof such as, for example, pyromellitic anhydride, 3,3',4,4'-benzophenone tetracarboxylic anhydride, or butane. tetracarboxylic acid.

For the purpose of increasing the amide bond ratio, an aromatic or aliphatic dibasic acid such as, for example, terephthalic acid, isophthalic acid, oxalic acid, malonic acid, succinic acid, glutaric acid, adipic acid, pimelic acid, suberic acid, or azelaic acid may be used in the place of a small portion of tricarboxylic acid.

For improvement of the solubility in organic solvents, the proportion of citric acid to the tricarboxylic acid and/or a derivative thereof is required to exceed 5 mol %, preferably 8 mol %.

If the proportion is less than 5 mol %, the solubility in organic solvents, particularly in phenolic solvents, falls short of reaching the expected level. The resultant resin composition, therefore, becomes impracticable.

The solubility in organic solvents increases in proportion as the proportion of citric acid is increased. Depending on the form in which the resin composition of this invention is used, the proportion of citric acid to the tricarboxylic acid may be freely varied above the lower limit of 5 mol %.

The thermal resistance increases as the proportion of trimelletic anhydride in the tricarbonxylic acid is increased.

Depending on the form in which the starting materials of this invention are preferably used, it is preferable to increase the proportion of the trimellitic acid and/or the anhydride thereof up to at least 40 mol %.

As the diisocyanate and/or derivative thereof to be used for this invention, any member selected from the group consisting of aliphatic, alicyclic, and aromatic diisocyanates and/or derivatives thereof can be used.

Preferable diisocyanate compounds use in the present invention include aliphatic or alicyclic diisocyanates such as ethylenediisocyanate, trimethylenediisocyanate, tetramethylenediisocyanate, pentamethylenediisocyanate, hexamethylenediisocyanate, heptamethylenediisocyanate, octamethylenediisocyanate, nonamethylenediisocyanate, decamethylenediisocyanate, trimethylhexamethylenediisocyanate, morpholinediisocyanate, cyclohexanediisocyanate and 3,9-bis(3-isocyanatopropyl)2,4,8,10-tetraoxaspiro [5,5]undecane; and aromatic diisocyanates such as 4,4'-diphenylmethanediiocyanate, 4,4'-diphenyletherdiisocyanate, 4,4'-diphenylpropanediisocyanate, 4,4'-diphenylsulfonediisocyanate, 3,3'-diphenylsulfonediisocyanate, 4,4'-diphenylsulfidediisocyanate, 3,3'-dimethyl-4,4'-diphenylmethanediisocyanate, 3,3'-dichloro-4,4'-diphenylmethanediisocyanate, 3,3'-dimethyl-4,4'bisphenyldiisocyanate, 3,3'-dimethoxy-4,4'-bisphenyldiisocyanate, 4,4'-bisphenyldiisocyanate, m-phenylenediisocyanate, p-phenylenediisocyanate, 2,4-tolylenediisocyanate, 2,6-tolylenediisocyanate, m-xylylenediisocyanate and p-xylylenediisocyanate. These compounds can be used solely or in the form of a mixture.

Moreover, there can be used diisocyanate derivatives which are prepared by masking isocyanate radical with phenol, cresol, xylenol, etc.

Diisocyanate and/or a part of these derivatives can be replaced by a small amount of polyisocyanate of more than trivalency such as 4,4',4''-triisocyanate-triphenylmethane, 2,2',5,5'-tetraisocyanate-4,4'-dimethyldiphenylmethane, etc.

Particularly, in view of heat resistance, mechanical properties, and economics, it is desired to use solely or in the form of a mixture 4,4'-diphenylmethanediisocyanate, 2,4-tolylenediisocyanate, 2,6-tolylenediisocyanate, m-xylylenediisocyanate, p-xylylenediisocyanate, 4,4'-diphenyletherdiisocyanate, etc. among the above mentioned isocyanate compounds.

In the reaction of tricarboxylic acid and/or anydride thereof containing citric acid with diisocyanate and/or a derivative thereof, the reaction temperature is generally in the range of 70° to 250° and the reaction time in the range of several hours to 30 hours, although both the reaction temperature and the reaction time may be varied by the particular kinds of raw materials, kinds of solvent and presence or absence of catalysts.

As the solvent to be used in the reaction, since the resin composition of the present invention has outstanding solubility, numerous organic solvents are available. It is undesirable, however, to adopt a solvent which reacts with the starting materials for the resin composition of this invention.

The solvents suitably used in the present invention are phenol, o-cresol, m-cresol, p-cresol, various xylenol various chlorophenols, nitrobenzene, N-methyl-2-pyrrolidone, N,N'-dimethylformamide, N,N'-dimethylacetoamide, hexamethylphosphoramide, dimethylsulfoxide, etc. The solvents which can be used with the above solvents are benzene, toluene, xylene, high boiling aromatic hydrocarbons(for example, Swazol 1000 or Swazol 1500 produced by Maruzen Oil Co., Ltd., Nisseki Hizol 100 or Nisseki Hizol 150 produced by Nippon Oil Co., Ltd., and the like), ethyleneglycolmonomethyletheracetate, etc.

In view of the stability, film-forming property, economics, etc. of the resin solution to be obtained, a particularly desirable solvent system is a mixture of a phenolic solvent such as phenol, cresol, or xylenol with a high boiling aromatic hydrocarbon type solvent.

Although the solids content of the starting materials prepared for the reaction is not specifically defined, it is desired to exceed 35%. This is because the reaction consumes much time, tends to entail secondary reactions, and fails to produce a resin composition of amply high polymerization degree when the solids content is less than 35%.

In the presence of a catalyst which is generally used in any reaction involving an isocyanate, the reaction of the present invention can be accelerated.

Examples of the catalyst suitably used for the acceleration of this reaction are lead monoxide, boric acid, lead naphthenate, metal salts of naphthenic acid, phosphoric acid, polyphosphoric acid, organic titanium compounds such as tetrabutyl titanate and triethanolamine titanate, triethylamine, and 1,8-diazabicyclo-(5,4,0)-undecene-7 (including acid adducts thereof).

The suitable amount of the use of the catalyst is 0.01 to 5% based on the solids content of the starting materials at the time of charging. The method of the addition of the catalyst is not particularly defined.

The tricarboxylic acid and/or anhydride thereof containing citric acid and the diisocyanate and/or derivative thereof are desired to be used in amounts of substantially equal moles, i.e. 1:1.

An excess of not more than 5 mol % is allowable for either of the reactants involved.

The tricarboxylic acid and/or anhydride thereof containing citric acid and the diisocyanate and/or derivative thereof may be simultaneously placed in the reaction vessel before the start of the reaction. Otherwise, one of the reactants may be dissolved in a solvent in advance and the other reactant added to the solution all at once or in several split portions. The method of charging the starting materials is not specifically defined.

The reaction may be suitably controlled, depending on the bubbling of carbon dioxide evolved by the reaction, the amount of the water of reaction to be distilled out, and the degree of viscosity of the reaction solution as observed during the course of the reaction.

The synthetic resin composition which is produced by the reaction carried out as described above can be used, even in its unmodified form, for the production of varnishes, films, laminated sheets, impregnating resin, and adhesive agents. When the synthetic resin composition is further modified by the incorporation of a polyhydric alcohol, for example, it exhibits enhanced adhesion and flexibility as it is applied to metal substrates and baked.

Polyhydric alcohols usable for modification of the synthetic resin composition are ethyleneglycol, propylene glycol, diethylene glycol, triethylene glycol, dipropylene glycol, tripropylene glycol, 1,3-butanediol, 1,4-butanediol, 1,3-propanediol, neopentyl glycol, 1,6-hexane glycol, trimethylol propane, trimethylol ethane, glycerin, pentaerythritol, 1,5-pentanediol, cyclohexane-1,4-diol, sorbitol, hexitol, erythritol, tris(2-hydroxyethyl)isocyanurate, etc. Particularly, it is preferable to use polyhydric alcohols of more than trivalency such as glycerin or tris(2-hydroxyethyl)isocyanurate.

For the reaction of the polyhydric alcohol with the reaction product (polyamide imide resin composition), the polyhydric alcohol may be directly added to the solution of the polyamide imide resin composition in a phenolic solvent and allowed to react with the resin composition. Otherwise, the polyhydric alcohol may be combined with the polyamide imide resin removed from the reaction mixture and they may be allowed to react either in the absence of a solvent or in the presence of an organic solvent.

When the polyamide imide resin composition to be produced is destined to be used in the form of a resin solution, however, the polyhydric alcohol is added to the reaction mixture during the last stage of the synthesis of the polyamide imide solution in the phenol type solvent and the reaction is allowed to continue further.

This reaction proceeds with evolution of distilled water. Thus, the reaction temperature is desired to be in the range of 180° to 250° C. to ensure perfect removal of the distilled water from the reaction system.

Although the duration of this reaction is variable with the degree with which the pressure of the reaction system falls, it is required to be in the range of 1 to 10-odd hours to ensure complete termination of the evolution of distilled water. Although the reaction proceeds even under atmospheric pressure, the pressure of the reaction system may be decreased for facilitating the liberation of distilled water on condition that the pressure decrease will not result in expulsion of the phenolic solvent from the reaction system.

This reaction proceeds in the absence of a catalyst. Optionally, any of the catalysts generally used in the reaction of a polyhydric alcohol may be used in this reaction.

Examples of the catalyst usable in this reaction are lead monoxide, lead naphthenate, zinc naphthenate, and other metal salts of naphthenic acid, tetrabutyl titanate, tetrapropyl titanate, triethanolamine titanate, and other similar organic titanium compounds.

The proportion of the polyhydric alcohol to the reaction product is particularly important. It is desired to be in the range of 0.05 to 0.7 mol per mol of the tricarboxylic acid used in the reaction.

When this proportion exceeds 0.7 mol, the adhesiveness and the compatibility with the aforementioned resin composition are both improved but the film to be produced from the resin composition is deficient in heat resistance, particularly in thermosoftening property. Thus, the proportion is not desired to exceed 0.7 mol.

The resin solution of the polyamide imide resin composition of the present invention can be used, either in its unmodified form or in a form combined with a suitable curing agent, for the production of insulating varnishes. Examples of the curing agent advantageously used in this combination include organic titanium compounds such as tetrabutyl titanate and tetrapropyl titanate, metal salts of naphthenic acid such as zinc naphthenate, Millionate MS-50 (block isocyanate made by Nippon Polyurethane Co.), and Desmodule CT staple (block isocyanate made by Bayer AG).

Further, the polyamide imide resin composition of the present invention can be used as combined with some other synthetic resin. Since the polyamide imide resin composition excels in compatibility with the polyester composition which is produced by the reaction of a polycarboxylic acid and/or a derivative thereof with a polyhydric alcohol, it may be used as combined with this particular polyester composition.

A typical example of the polyester composition is a thermosetting initial condensate which is widely known as a polyester type resin varnish in the field of insulating varnishes. This composition can be used in its unmodified form.

Examples of the polycarboxylic acid and/or derivative thereof which serves as the starting material for the aforementioned resin composition include terephthalic acid, o isophthalic acid, 4,4'-benzophenone dicarboxylic acid, 4,4'-diphenyl dicarboxylic acid, and naphthalene dicarboxylic acid. Lower alkyl esters, acid chlorides, and other similar derivatives of such polycarboxylic acids are also usable.

As a polyhydric alcohol in the starting materials for the aforementioned resin composition, there may be used at least one polyhydric alcohol selected from the group of polyhydric alcohols enumerated previously as usable for the modification of the polyamide imide resin composition.

The reaction of the polycarboxylic acid and/or derivative thereof with the polyhydric alcohol for the production of the aforementioned polyester composition can be effected by causing the two reactants to undergo polycondensation by a normal method in the absence of a solvent or in the presence of a phenolic solvent, on the condition that the reaction will not entail gelation.

The proportion of the polyester resin composition to the polyamide imide resin composition is desired to be not more than 30% by weight based on the total resin composition to be obtained by the combination.

When the proportion exceeds 30% by weight, the resistance to heat shock, the resistance to abrasion, and the resistance to heat aging in the polyamide imide resin are impaired. Thus, the proportion is not allowed to exceed 30% by weight.

The polyamide imide resin composition which has been modified with the polyhydric alcohol as described above has a hydroxyl group at the terminal of its molecule. Thus, it exhibits notably improved compatibility with the polyester type resin possessing a terminal group in the molecule.

The polyamide imide composition obtained by the reaction of the tricarboxylic acid and/or anhydride thereof containing citric acid with the diisocyanate, the synthetic resin composition produced by modifying the polyamide imide composition with a polyhydric alcohol, and the synthetic resin composition produced by combining the aforementioned synthetic resin composition with a thermosetting resin such as, for example, a polyester resin can be used in their unmodified form or in a form diluted with a phenolic solvent or some other high boiling aromatic hydrocarbon type solvent for the production of insulating varnishes (for coated wires, films, and laminated sheets).

The desirable mixing ratio of the resin composition (solids) and the solvent is 15 to 60% by weight of the former to 85 to 40% by weight of the latter (viscosity 50 to 30000 cps).

Now, the present invention will be described more specifically below with reference to examples of the invention.

EXAMPLE 1

A 3-liter four-necked flask fitted with a thermometer, a stirrer, a condenser, and a nitrogen inlet tube was charged with 96.1 g (0.5 mol) of anhydrous citric acid, 96.1 g (0.5 mol) of trimellitic anhydride, 250.3 g (1.0 mol) of diphenylmethane diisocyanate, and 400 g of m-cresol. Under a stream of nitrogen gas, the reactants were heated up to 200° C. over a period of about one hour.

Vigorous bubbling was observed to start at about 70° C. and bubbling and evolution of distilled water were observed to occur in the range of 160° to 180° C.

The reaction was continued for 20 hours at the refluxing temperature of m-cresol (200° to 210° C.).

During the reaction, the reaction mixture was observed to increase in viscosity and was found to be clear. Then the reaction mixture was amply stirred with 400 g of cresol added thereto. Consequently, there was obtained a clear, reddish brown resin solution having solid contents of 30.1 wt % (200° C.×1.5 hrs. The same shall apply hereinafter.) and a viscosity of 72 poise (at 25° C.).

The resin solution thus produced was coated on a copper plate 0.1 mm in thickness and baked at 200° C. for 20 minutes and at 250° C. for 30 minutes. The film thus produced on the copper plate possessed ample flexibility. The film was so flexible that there was not observed any crack when the film-coated copper plate was bent at an angle of 90° along the surface of a copper rod of 1 cm diameter. The infrared absorption spectrum of this film showed an absorption of imide group at 1780 cm$^{-1}$ and an absorption of amide group at 1650 cm$^{-1}$ respectively.

The resin solution was coated on a copper wire 1.0 mm in diameter and baked. The insulated wire thus produced showed the properties given in Table 1.

EXAMPLE 2

A 3-liter four-necked flask fitted with a thermometer, a stirrer, a condenser, and a nitrogen inlet tube was charged with 153.7 g (0.8 mol) of anyhrous citric acid, 38.4 g (0.2 mol) of trimellitic anhydride, 250.3 g (1.0 mol) of diphenylmethane diisocyanate, and 300 g of m-cresol. Under a stream of nitrogen gas, the reactants were heated up to 200° C. over a period of about two hours.

Vigorous bubbling was observed to start at about 70° C. and bubbling and evolution of distilled water were observed to occur in the range of 160° to 200° C.

The reaction was continued at 210° C. for 18 hours while distilling off the distilled water.

During the reaction, the reaction mixture was observed to increase in viscosity and was found to be clear.

Then, the reaction mixture was amply stirred with 800 g of m-cresol and 260 g of Solvent naphtha (Swazol #1000 made by Maruzen Oil Co., Ltd.) added thereto. Consequently, there was obtained a clear, reddish brown resin solution having solid contents of 20.0 wt % and a viscosity of 45 poise (at 25° C.).

The resin solution thus produced was coated on a copper plate 0.1 mm in thickness and baked at 200° C. for 20 minutes and at 250° C. for 30 minutes. The film thus produced on the copper plate possessed ample flexibility. The infrared absorption spectrum of this film showed an absorption of imide group at 1780 cm$^{-1}$ and an absorption of amide group at 1650 cm$^{-1}$ respectively.

The resin solution was coated on a copper wire 1.0 mm in diameter and baked. The insulated wire thus produced showed the properties given in Table 1.

EXAMPLE 3

A 3-liter four-necked flask fitted with a thermometer, a stirrer, a condenser, and a nitrogen inlet tube was charged with 19.2 g (0.1 mol) of anhydrous citric acid, 172.8 g (0.9 mol) of trimellitic anhydride, 250.3 g (1.0 mol) of diphenylmethane diisocyanate, and 400 g of m-cresol. Under a stream of nitrogen gas, the reactants were heated up to 200° C. over a period of about one hour.

Vigorous bubbling was observed to start at about 70° C. and evolution of distilled water in a small amount was observed to occur in the range of 160° to 170° C.

The reaction was continued for 22 hours at the refluxing temperature of cresol (200° to 210° C.) while distilling off a small amount of cresol.

During the reaction, the reaction mixture was observed to increase in viscosity and was found to be clear.

The total amount of the distilled cresol was 100 g.

Then, the reaction mixture was amply stirred with 800 g of m-cresol added thereto. Consequently, there was obtained a clear, reddish brown resin solution having solid contents of 23.3 wt % and a viscosity of 55 poise (at 25° C.).

The resin solution thus produced was coated on a copper plate 0.1 mm in thickness and baked at 200° C. for 20 minutes and at 250° C. for 30 minutes. The film thus produced on the copper plate possessed ample flexibility. The infrared absorption spectrum of this film showed an absorption of imide group at 1780 cm$^{-1}$ and an absorption of amide group at 1650 cm$^{-1}$ respectively.

Figure 1:
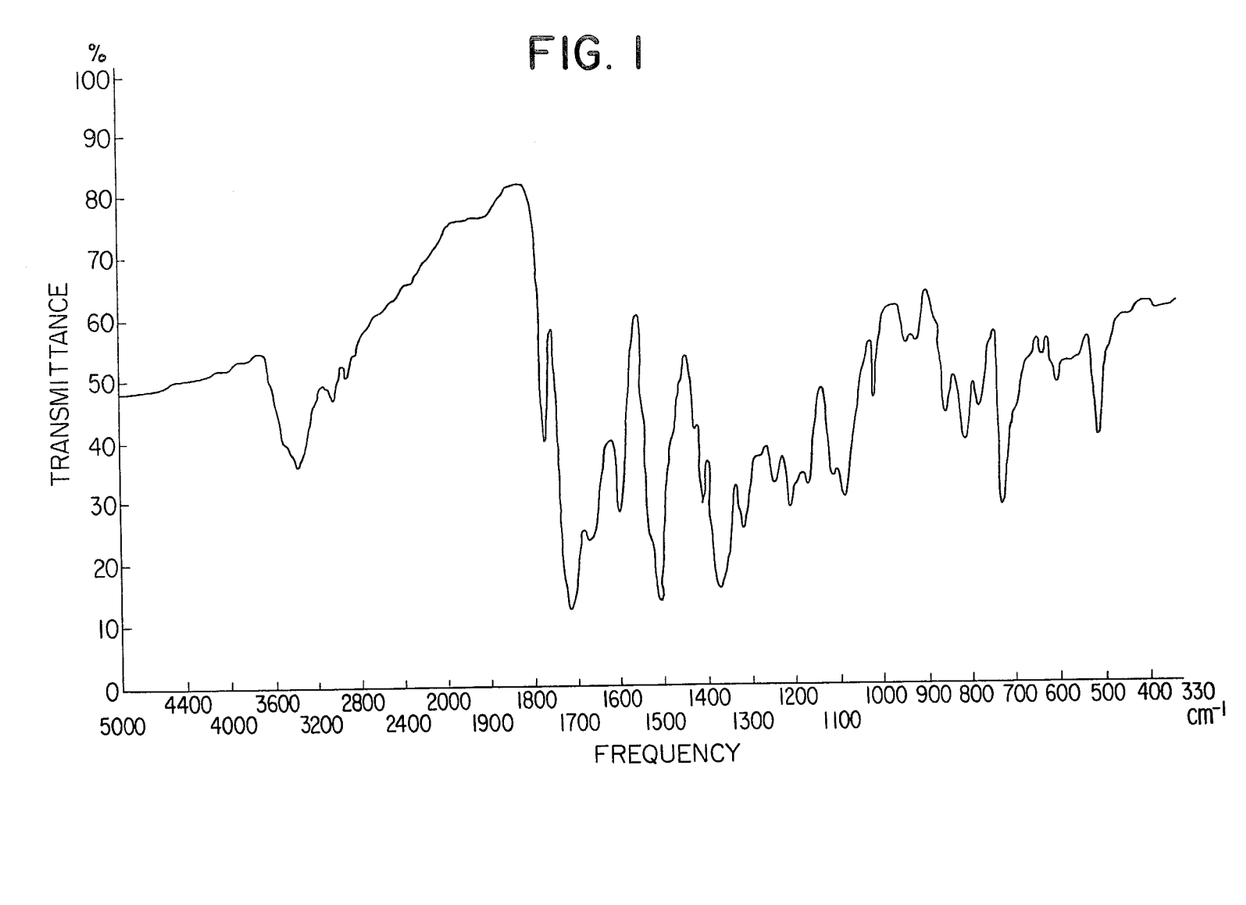
FIG. 1 and FIG. 2 are infrared absorption spectra of polyamide imide resins obtained in different preferred embodiments of the present invention.

FIG. 1 shows the infrared absorption spectrum.

The resin solution was coated on a copper wire 1.0 mm in diameter and baked. The insulated wire thus produced showed the properties given in Table 1.

EXAMPLE 4

A 3-liter four-necked flask fitted with a thermometer, a stirrer, a condenser, and a nitrogen inlet tube was charged with 192.1 g (1.0 mol) of anhydrous citric acid, 250.3 g (1.0 mol) of diphenylmethane diisocyanate, and 500 g of m-cresol. Under a stream of nitrogen gas, the reactants were heated up to 200° C. over a period of about one hour.

Vigorous bubbling was observed to start at about 70° C. and bubbling and evolution of distilled water in a large amount were observed to occur in the range of 160° to 200° C.

When the reaction was continued at 200° C. for 10 hours, the reaction mixture was observed to increase in viscosity and assumed glation.

Then, the reaction mixture was amply stirred with 800 g of cresol added thereto. Consequently, there was obtained a clear, reddish brown resin solution having solid contents of 19.2 wt % and a viscosity of 31 poise (at 25° C.).

The resin solution thus produced was spread on a copper plate 1.0 mm in thickness and baked at 200° C. for 20 minutes and at 250° C. for 30 minutes. The film thus produced on the copper plate possessed ample flexibility. The infrared absorption spectrum of this film showed an absorption of imide group at 1780 cm$^{-1}$ and a broad absorption of amide group at 1640-1680 cm$^{-1}$ respectively.

Figure 2:
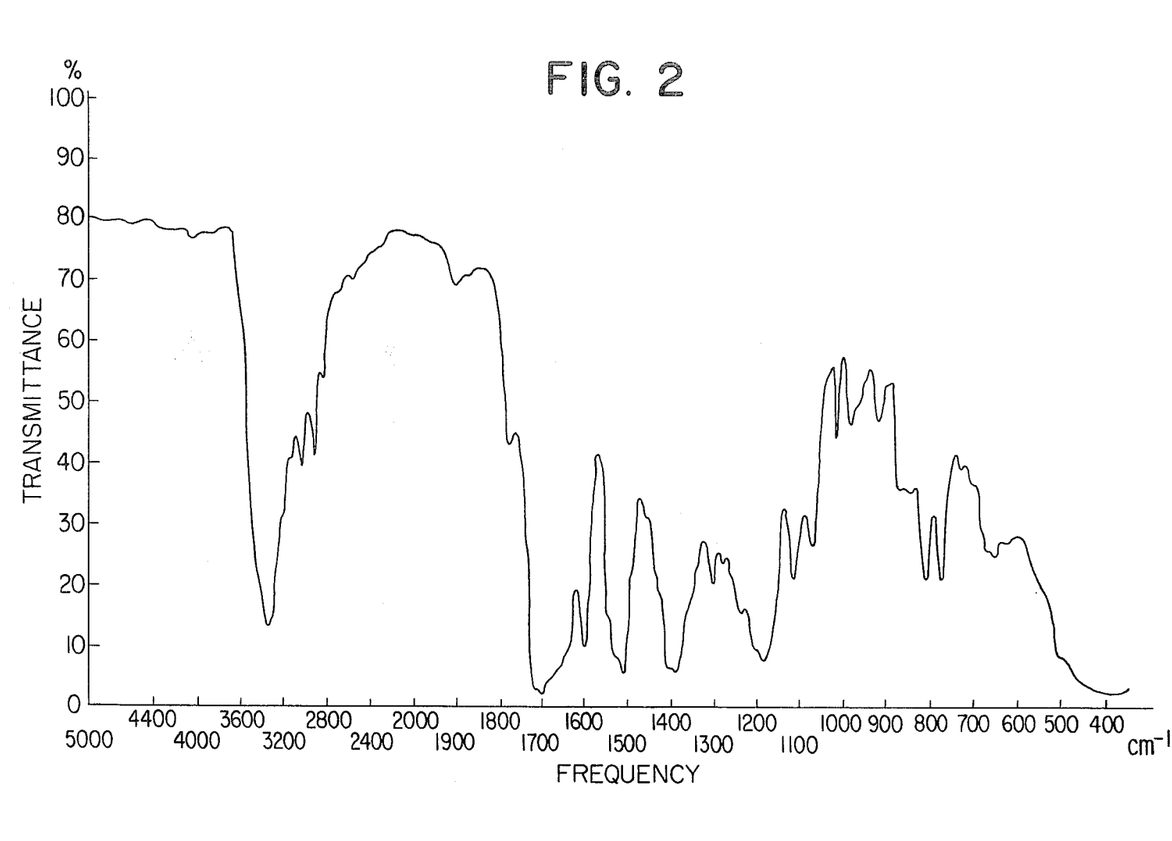

FIG. 2 shows the infrared absorption spectrum.

The resin solution was coated on a copper wire 1.0 mm in diameter and baked. The insulated wire thus produced showed the properties given in Table 1.

EXAMPLE 5

A 3-liter four-necked flask fitted with a thermometer, a stirrer, a condenser, and a nitrogen inlet tube was charged with 11.5 g (0.06 mol of anhydrous citric acid, 180.6 g (0.94 mol) of trimellitic anhydride, 87.1 g (0.5 mol) of diphenylmethane diisocyanate, 87.1 g (0.5 mol) of tolylene diisocyanate, and 400 g of m-cresol. Under a stream of nitrogen gas, the reactants were heated up to 200° C. over a period of about one hour.

Vigorous bubbling was observed to start at about 70° C. and bubbling and evolution of a small amount of distilled water were observed to occur in the range of 160° to 170° C.

The reaction was continued at 210° C for 10 hours.

Then, the reaction mixture was amply stirred with 550 g of m-cresol added thereto. Consequently, there was obtained a clear, reddish brown resin solution having solid contents of 25.0 wt % and a viscosity of 75 poise (at 25° C.).

The resin solution thus produced was coated on a copper plate 1.0 mm in thickness and baked at 200° C. for 20 minutes and at 250° C. for 30 minutes. The film thus produced on the copper plate possessed ample flexibility. The infrared absorption spectrum of this film showed an absorption of imide group at 1780 cm$^{-1}$ and an absorption of amide group at 1650 cm$^{-1}$ respectively.

The resin solution was coated on a copper wire 1.0 mm in diameter and baked. The insulated wire thus produced showed the properties given in Table 1.

EXAMPLE 6

A 3-liter four-necked flask fitted with a thermometer, a stirrer, a condenser, and a nitrogen inlet tube was charged with 38.4 g (0.2 mol) of anhydrous citric acid, 153.7 g (0.8 mol) of trimellitic anhydride, 262.8 g (1.05 mol) of diphenylmethane diisocyanate, and 400 g of m-cresol. Under a stream of nitrogen gas, the reactants were heated up to 200° C. over a period of about one hour.

Vigorous bubbling was observed to start at about 70° C. and bubbling and evolution of distilled water were observed to occur in the range of 160° to 180° C.

When the first vigorous bubbling was over at 200° C., 4 g of boracic acid was added and the reaction was continued for 7 hours in total at said temperature.

During the reaction, the reaction mixture was observed to increase in viscosity and was found to be clear.

Then, the reaction mixture was amply stirred with 350 g of cresol and 330 g of solvent naphtha (Swazol #1000 made by Maruzen Oil Co., Ltd.) added thereto. Consequently, there was obtained a clear, reddish brown resin solution having solid contents of 25.2 wt % and a viscosity of 82 poise (at 25° C.).

The resin solution thus produced was coated on a copper plate 0.1 mm in thickness and baked at 200° C. for 20 minutes and at 250° C. for 30 minutes. The film thus produced on the copper plate possessed ample flexibility. The infrared absorption spectrum of this film showed an absorption of imide group at 1780 cm$^{-1}$ and an absorption of amide group at 1650 cm$^{-1}$ respectively.

The resin solution was coated on a copper wire 1.0 mm in diameter and baked. The insulated wire thus produced showed the properties given in Table 1.

EXAMPLE 7

A 3-liter four-necked flask fitted with a thermometer, a stirrer, a condenser, and a nitrogen inlet tube was charged with 250.3 g (1.0 mol) of diphenylmethane diisocyanate, and 400 g of m-cresol.

The reactants were heated up to 200° C. and reacted thermally for a period of 30 minutes.

A part of the content was removed and its infrared absorption spectrum was measured. Absorption of isocyanate group at 2260 cm$^{-1}$ was not observed and it was confirmed that diisocianate was masked with m-cresol.

After lowering the inside temperature of the flask to 70° C., 57.6 g (0.3 mol) of anhydrous citric acid, and 134.5 g (0.7 mol) of trimellitic anhydride were added. Under a stream of nitrogen gas, the mixture was heated up to 200° C. over a period of about one hour.

Bubbling was gradually observed to start at about 130° C. and effervescence and evolution of distilled water were observed to occur at about 150° C.

The reaction was continued at 210° C. for 12 hours.

Then, the reaction mixture was amply stirred with 450 g of m-cresol and 200 g of solvent naphtha (Swazol #1000 made by Maruzen Oil Co., Ltd.) added thereto. Consequently, there was obtained a clear, reddish brown resin solution having solid contents of 24.8 wt % and a viscosity of 52 poise (at 25° C.).

The resin solution thus produced was coated on a copper plate 1.0 mm in thickness and baked at 200° C. for 20 minutes and at 250° C. for 30 minutes. The film thus produced on the copper plate possessed ample flexibility. The infrared absorption spectrum of this film showed an absorption of imide group at 1780 cm$^{-1}$ and an absorption of amide group at 1650 cm$^{-1}$ respectively.

The resin solution was coated on a copper wire 1.0 mm in diameter and baked. The insulated wire thus produced showed the properties given in Table 1.

EXAMPLE 8

To 1000 g of the resin solution of Example 3, 5 g of tetrabutyltytanate was gradually added at room temperature and amply stirred.

This resin solution was spread on a copper wire 1.0 mm in diameter and baked. The insulated wire thus produced showed properties given in Table 1.

Figure 3:
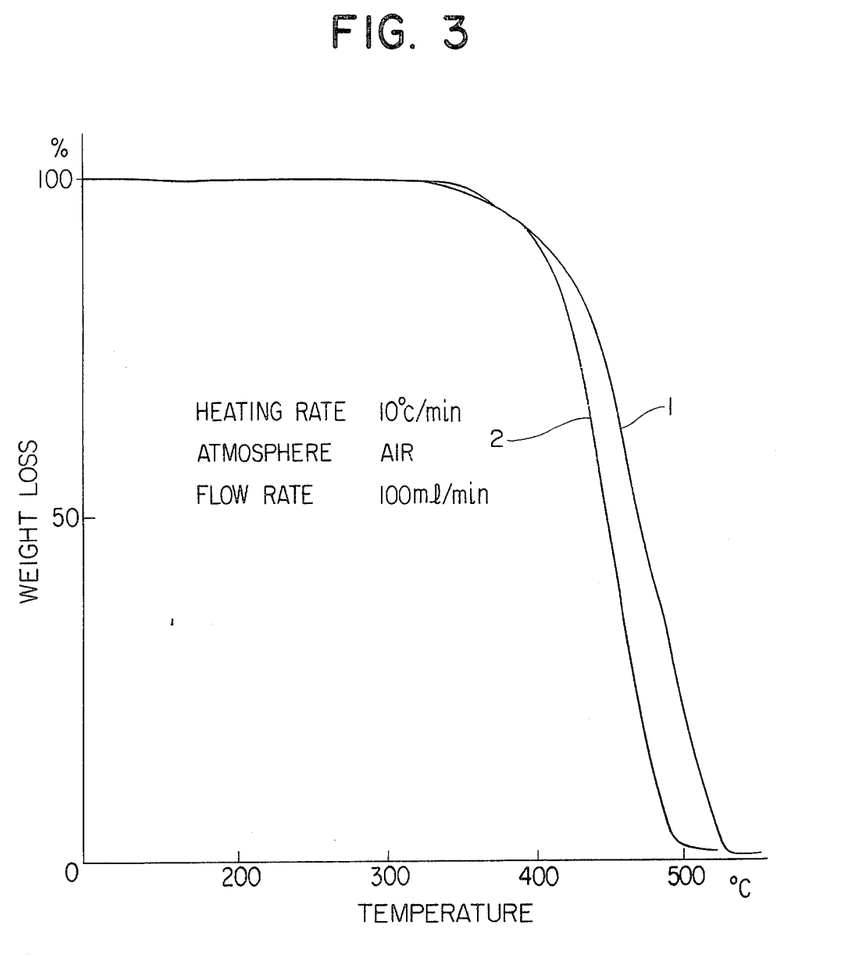
FIG. 3 is a TG (thermogravimetric) curve of a polyamide imide resin obtained in a further preferred embodiment of this invention.

Further, the coat of the insulated wire was measured for TG curve at a heating rate of 10° C./min, and in an atmosphere of air blow rate 100 ml/min. The results are shown in FIG. 3. In this graph, 1 denotes the wire coat of Example 3 and 2 denotes a wire coat (for comparison) produced by a commercially available polyamide imide varnish.

For comparison, there was used an insulating coat prepared from an amide-imide varnish (HI-400 made by Hitachi Chemical Co., Ltd.) containing as a main solvent a commercially available N-methyl-2-pyrrolidone.

EXAMPLE 9

A 3-liter four-necked flask fitted with a thermometer, a stirrer, a condenser, and a nitrogen inlet tube, was charged with 38.4 g (0.2 mol) of anhydrous citric acid, 153.7 g (0.8 mol) of trimellitic anhydride, 200.2 g (0.8 mol) of diphenylmethane diisocyanate, 25.2 g (0.1 mol) of diphenyletherdiisocyanate, 18.8 g (0.1 mol) of xylylenediisocyanate, and 400 g of m-cresol. Under a stream of nitrogen gas, the reactants were heated up to 200° C. over a period of about one hour.

Vigorous bubbling was observed to start at about 70° C. and evolution of distilled water were observed to occur in the range of 160° to 180° C.

The reaction was continued at 210° C. for 15 hours. Then, the reaction mixture was amply stirred with 680 g of m-cresol and 300 g of solvent naphtha (Swazol #1000 made by Maruzen Oil Co., Ltd.) added thereto. Consequently, there was obtained a clear, reddish brown resin solution having solid contents of 20.0 wt % and a viscosity of 45 poise (at 25° C.).

The resin solution thus produced was coated on a copper plate 1.0 mm in thickness and baked at 200° C. for 20 minutes and at 250° C. for 30 minutes. The film thus produced on the copper plate possessed ample flexibility. The infrared absorption spectrum of this film showed an absorption of imide group at 1780 cm$^{-1}$ and an absorption of amide group at 1650 cm$^{-1}$ respectively.

The resin solution was coated on a copper wire 1.0 mm in diameter and baked. The insulated wire thus produced showed the properties given in Table 1.

EXAMPLE 10

A 3-liter four-necked flask fitted with a thermometer, a stirrer, a condenser, and a nitrogen inlet tube was charged with 19.2 g (0.1 mol) of anhydrous citric acid, 172.8 g (0.9 mol) of trimellitic anhydride, 250.3 g (1.0 mol) of diphenylmethane diisocyanate, 300 g of m-cresol, 100 g of solvent naphtha, and 1.0 g of boric acid. Under a stream of nitrogen gas, the reactants were heated up to 200° C. cover a period of about one hour.

Vigorous bubbling was observed to start at about 70° C. and bubbling and evolution of distilled water in a small amount were observed to occur in the range of 160° to 170° C.

The reaction was continued for 5 hours at the refluxing temperature of m-cresol (200° to 210° C.) while distilling off a small amount of cresol.

The reaction was continued by adding 52 g (0.2 mol) of tris(2-hydroxyethyl) isocyanurate at 200° C.

By the addition of tris(2-hydroxyethyl) isocyanurate, dehydration reaction was observed and water was distilled together with a small amount of m-cresol.

In two hours, the viscosity of the content increased, so that the stirring proceeded with difficulty. 400 g of m-cresol was added thereto to stop the reaction.

After the temperature was lowered to room temperature, m-cresol and 140 g of diphenylmethanediisocyanate (containing 50% by weight of diphenylmethanediisocyanate) which was blocked with m-cresol were added and amply stirred. Consequently, there was obtained a clear, reddish brown resin solution having solid contents of 24.3 wt % and a viscosity of 30 poise.

The resin solution was coated on a copper wire 1.0 mm in diameter and baked. The insulated wire thus produced showed the properties given in Table 2.

EXAMPLE 11

To the same 3-liter four-necked flask as used in Example 1 were added 19.2 g (0.1 mol) of anhydrous citric acid, 172.8 g (0.9 mol) of trimellitic anhydride, 252 g (1.01 mol) of diphenylmethane diisocyanate, 500 g of m-cresol, and 100 g of solvent naphtha. Under a stream of nitrogen gas, the reactants were heated up to 200° C. over a period of about one hour. Vigorous bubbling was observed to start at about 70° C. and bubbling and evolution of distilled water were observed to occur in the range of 160° to 180° C.

TABLE 1

| Property | | 1 | 2 | 3 | 4 | 5 | 6 | 7 | 8 | 9 |
|---|---|---|---|---|---|---|---|---|---|---|
| Size | diameter of a conductor | 0.999 | 0.997 | 0.998 | 0.998 | 0.998 | 0.999 | 0.999 | 0.999 | 0.998 |
| (mm) | thickness of a film | 0.038 | 0.038 | 0.038 | 0.030 | 0.035 | 0.032 | 0.038 | 0.038 | 0.036 |
| Appearance | | Smooth | Smooth | Smooth | Smooth | Smooth | Smooth | Smooth | Smooth | Smooth |
| Flexibility (X1d Mandrel) | | Good | Good | Good | Good | Good | Good | Good | Good | Good |
| Number of pin holes per 5 meters | | 0 | 0 | 0 | 0 | 0 | 0 | 0 | 0 | 0 |
| Break down voltage (Kv) | | 11.0 | 10.5 | 10.0 | 10.0 | 10.0 | 12.3 | 11.4 | 12.0 | 10.5 |
| Cut through temperature (Parallel crossing, load 6 kg, 2° C./min, °C.) | | 405 | 394 | 440 | 396 | 451 | 458 | 432 | 446 | 434 |
| Abrasion repeating scrape under a load of 600 g, time | | 232 | 211 | 184 | 130 | 250 | 202 | 185 | 193 | 204 |
| Heat shock (250° C. × 1 hr.) (ld Mandrel) | | Good | Good | Good | Good | Good | Good | Good | Good | Good |
| Resistance to chemicals solvents (Room temp × 24 hrs.) | | Good | Good | Good | Good | Good | Good | Good | Good | Good |

Sample were prepared by baking at a baking speed of 10 m/min in baking furnace of 7 m in length at a furnace temperature of 400° C.
Insulated wires were tested in accordance with the method of JIS C3003. (The same shall apply hereinafter)

When the first vigorous effervescene was over at 200° C., 4 g of boric acid was added and the reaction was continued for 9 hours in total.

During the reaction, the reaction mixture was observed to be clear.

At 200° C., 78 g (0.3 mol) of tris(2-hydroxyethyl) isocyanurate was added to the resin solution and the reaction was continued for 5 hours while removing the distilled water. In about four hours, the distilling off of the water was became an unobserved. After cooling the solution to room temperature, 5.0 g of tetrabutyletitanate and m-cresol were added and amply stirred.

Consequently, there was obtained a clear, reddish brown resin solution having solid contents of 37.8 wt % and a viscosity of 53 poise.

The resin solution was coated on a copper wire 1.0 mm in diameter and baked. The insulated wire thus produced showed the properties given in Table 2.

EXAMPLE 12

To the same 3-liter four-necked flask as used in Example 1 were added 38.4 g (0.2 mol) of anhydrous citric acid, 153.7 g (0.8 mol) of trimellitic anhydride, 200 g (0.8 mol) of diphenylmethane diisocyanate, 34.8 g (0.2 mol) of tolylenediisocyanate 300 g of m-cresol, and 50 g solvent naphtha. Under a stream of nitrogen gas, the reactants were heated up to 200° C. over a period of about one hour. Vigorous bubbling was observed to start at about 70° C. and effervescence and evolution of distilled water in a small amount were observed to occur in the range of 160° to 170° C.

The reaction was continued at 200° C. for five hours.

During the reaction, the reaction mixture was observed to be clear.

Then, at 200° C., 9.0 g (0.98 mol) of glycerin was added to the resin solution and the reaction was continued for 3 hours while removing the distilled water.

After cooling the solution to room temperature by adding 300 g of m-cresol, and 70 g of diphenylmethanediisocyanate(containing 50% weight of diphenylmethane diisocyanate) which was blocked with m-cresol were added and amply stirred.

Consequently, there was obtained a clear, reddish brown resin solution having solid contents of 35 wt % and a viscosity of 63 poise.

The resin solution was coated on a copper wire 1.0 mm in diameter and baked. The insulated wire thus produced showed the properties given in Table 2.

TABLE 2

| Property | Example 10 | Example 11 | Example 12 |
|---|---|---|---|
| Size (mm) diameter of a conductor | 0.998 | 0.999 | 1.000 |
| Size (mm) thickness of a film | 0.038 | 0.036 | 0.038 |
| Appearance | Smooth | Smooth | Smooth |
| Flexibility | X1d good | X1d good | X1d good |
| Number of pin holes (3% elongated wire) | 0 | 0 | 0 |
| Break down voltage (Kv) | 12.0 | 13.3 | 11.6 |
| Break down voltage (260° C. × 168 hrs. after heat) | 89.2 | — | 92.1 |
| Cut through temperature (°C.) (Parallel crossing, load 6 kg, 2° C./min, °C.) | 405 | 400 | 408 |
| Abrasion repeating scrape under a load of 600 g | 178 | 214 | 280 |
| Heat shock (250° C. × 1 hr.) | X1d good | X1d good | X1d good |

Sample were prepared by baking at a baking speed of 14 m/min in baking furnace of 7 m in length at a furnace temperature of 400° C.

EXAMPLE 13

A 3-liter four-necked flask fitted with a thermometer, a stirrer, a condenser, and a nitrogen inlet tube was charged with 19.2 g (0.1 mol) of anhydrous citric acid, 172.8 g (0.9 mol) of trimellitic anhydride, 250.3 g (1.0 mol) of diphenylmethane diisocyanate, and 300 g of m-cresol. Under a stream of nitrogen gas, the reactants were heated up to 200° C. over a period of about one hour. Vigorous bubbling was observed to start at about 70° C. and bubbling and evolution of distilled water were observed to occur in the range of 160° to 180° C.

The reaction was continued for about four hours at the refluxing temperature of m-cresol (200° to 210° C.).

During the reaction, the reaction mixture was observed to increase in viscosity and was found to be clear.

Then, the reaction mixture was amply stirred with 400 g of cresol added thereto. Consequently, there was obtained a clear, reddish brown polyamide imide resin solution having solid contents of 30.1 wt % and a viscosity of 61 poise (at 35° C.).

Separately, a 3-liter three-necked flask was charged with 194 g (1.0 mol) of dimethyl, 18.6 g (0.3 mol) of ethylene glycol, 208.8 g (0.8 mol) of tris (2-hydroxyethyl) isocyanurate, 4 g of lead napthenate, and 50 g of solvent naphtha. While distilling off methanol produced by the reaction, the temperature was gradually increased to 200° C. over a period of about five hours, so that the ester exchange reaction was completed. Then, by continuing the reaction at 220° C., the condensed reaction was conducted so that the time of gelation of the resin falls within 20–25 seconds at 250° C.

The obtained polyester resin was diluted with a mixture solvent consisting of cresol and naphtha in the ratio of 27 to 3 and added with 7 g of tetrabutyl titanate at room temperature thereby an involatile content was adjusted to 40% by weight (a viscosity of 42 poise).

The above mentioned polyamide imide resin solution and polyester resin solution were mixed in the weight ratio of 100 to 75.3 and stirred at 200° C. for one hour.

The resin solution was coated on a copper wire 1.0 mm in diameter and baked. The insulated wire thus produced showed the properties given in Table 3.

EXAMPLE 14

100 parts by weight of polyamide imide resin solution of Example 11 and polyester resin solution of Example 13 were mixed in the weight ratio of 100 to 94.5 and stirred at 160° C. for 30 minutes.

EXAMPLE 15

A synthetic resin composition was prepared by mixing polyamide imide and polyester in accordance with the procedure of Example 13 except that the mixing ratio of polyamide imide resin solution and polyester resin solution was changed to 100:32.3 in weight ratio.

EXAMPLE 16

A synthetic resin composition was prepared by mixing polyamide imide and polyester in accordance with the procedure of Example 14 except that the mixing ratio of polyamide imide resin solution and polyester resin solution was changed to 100:50.2 in weight ratio and a thermal stirring after the mixing was not conducted.

The synthetic resin compositions of Examples 13 to 16 were spread on copper wires 1.0 mm in diameter and baked. The insulated wires thus produced showed the properties given in Table 3.

TABLE 3

| Property | Example 13 | Example 14 | Example 15 | Example 16 |
|---|---|---|---|---|
| Size (mm) diameter of a conductor | 0.998 | 0.999 | 1.000 | 0.999 |
| Size (mm) thickness of a film | 0.038 | 0.038 | 0.038 | 0.038 |
| Appearance | Smooth | Smooth | Smooth | Smooth |
| Flexibility (X1d Mandrel) | Good | Good | Good | Good |
| Number of pin holes per 5 meters | 0 | 0 | 0 | 0 |
| Break down voltage (Kv) | 12.0 | 11.7 | 12.1 | 11.9 |
| Cut through temperature (parallel crossing, load 6 kg, 2° C./min, °C.) | 395 | 383 | 403 | 400 |
| Abrasion repeating scrape under a load of 600 g | 123 | 131 | 197 | 140 |
| Heat shock 250° C. × 1 hr. | X1d good | X1d good | X1d good | X2d good |
| Heat shock 270° C. × 1 hr. | X2d good | X2d good | X1d good | X1d good |
| Resistance to chemicals, solvents (Room temp × 24 hrs.) | Good | Good | Good | Good |
| Moisture* 180° C. × 10 hrs. | 105.0% | 100.1% | 100.5% | 180.0% |
| resistance 130° C. × 100 hrs. | 83.1% | 78.2% | 98.1% | 90.5% |
| Deterioration resistance **(260° C. × 7 days) | 95.3% | 90.6% | 99.5% | 98.9% |

*A twist sample and 0.2 wt % of water were charged in a glass tube and heated. After the heating the residual rate of dielectric break down voltage value was measured.
**After heating a twist sample in an atmosphere of air, the residual rate of dielectric break down voltage value was measured.

COMPARATIVE EXPERIMENT

A 3-liter four-necked flask fitted with a thermometer, a stirrer, a condenser, and a nitrogen inlet tube was charged with 192.1 g (1.0 mol) of trimellitic anhydride, 250.3 g (1.0 mol) of diphenyl methane diisocyanate, and 400 g of m-cresol. Under a stream of nitrogen gas, the reactants were heated up to 200° C. over a period of about one hour. Bubbling was observed to start at about of 70° C. and no evolution of distilled water was observed at about 160° C. At the refluxing temperature of m-cresol (200° to 210° C.), the reaction mixture clearness. Even after 10 hours of the reaction, the reaction mixture failed to resume clearness.

What is claimed is:

1. A heat-resistant synthetic resin composition, which comprises (A) 15 to 60% by weight of a film-forming synthetic resin soluble in a phenolic solvent and (B) 85 to 40% by weight of a phenolic solvent, said film-forming synthetic resin containing at least 30% by weight of a polyamide imide resin derived from substantially equal molar amounts of (a) a tricarboxylic acid and/or an anhydride thereof containing at least 5 mol % of citric acid and (b) a diisocyanate and/or a derivative obtained by masking diisocyanate with a phenolic compound.

2. A heat-resistant synthetic resin composition according to claim 1, wherein the polyamide imide resin is prepared by reacting (a) a tricarboxylic acid and/or an anhydride thereof containing at least 5 mol % of citric acid with (b) a diisocyanate and/or derivative obtained by masking diisocyanate with a phenolic compound in (c) a phenolic solvent.

3. A heat-resistant synthetic resin composition according to claim 1, wherein the tricarboxylic acid and/or the anhydride thereof comprises at least 40 mol % of trimellitic anhydride.

4. A heat-resistant synthetic resin composition according to claim 2, wherein the film-forming synthetic resin further comprises a thermosetting resin.

5. A heat-resistant synthetic resin composition according to claim 4, wherein the thermosetting resin is a polyester resin.

6. A heat-resitant synthetic resin composition according to claim 5, whreein the polyester resin is prepared by reacting (a) a dimethyl terephthalate, (b) ethylene glycol and (c) tris isocyanurate in (d) a phenolic solvent.

* * * * *

UNITED STATES PATENT AND TRADEMARK OFFICE
CERTIFICATE OF CORRECTION

PATENT NO. : 4,477,624
DATED : October 16, 1984
INVENTOR(S) : Misao Waki

It is certified that error appears in the above-identified patent and that said Letters Patent is hereby corrected as shown below:

Claim 5, line 1, change "compositicn" to -- composition --.

Claim 6, line 2, change "whreein" to -- wherein --.

Claim 6, line 4, change "tris isocyanurate" to -- tris (2-hydroxyethyl) isocyanurate --.

Signed and Sealed this

Eighteenth Day of June 1985

[SEAL]

Attest:

DONALD J. QUIGG

Attesting Officer

Acting Commissioner of Patents and Trademarks